US011316291B2

(12) United States Patent
Hikosaka

(10) Patent No.: US 11,316,291 B2
(45) Date of Patent: Apr. 26, 2022

(54) BOARD MOUNTING CONNECTOR WITH INCLINATION SUPPRESSING STRUCTURE

(71) Applicant: YAZAKI CORPORATION, Tokyo (JP)

(72) Inventor: Tomohiro Hikosaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/151,082

(22) Filed: Jan. 15, 2021

(65) Prior Publication Data

US 2021/0226363 A1 Jul. 22, 2021

(30) Foreign Application Priority Data

Jan. 21, 2020 (JP) .............................. JP2020-007493

(51) Int. Cl.
*H01R 12/70* (2011.01)
*G02B 6/42* (2006.01)
(Continued)

(52) U.S. Cl.
CPC ......... *H01R 12/7052* (2013.01); *G02B 6/426* (2013.01); *G02B 6/4246* (2013.01);
(Continued)

(58) Field of Classification Search
CPC .... H01R 12/7052; H01R 13/50; H01R 12/55; H01R 13/6594; H01R 12/7011; H01R 13/46; H01R 12/57; H01R 13/516; H01R 13/52; H01R 13/518; H01R 13/6587; H01R 13/6595; H01R 12/724; H01R 13/6658; H01R 12/721; H01R 12/722; G01B 6/4246; G01B 6/426; G01B 6/4277; G01B 6/4284; G01B 6/428; G01B 6/3897; G01B 6/4245; G01B 6/4292

See application file for complete search history.

(56) References Cited

U.S. PATENT DOCUMENTS

| | | | |
|---|---|---|---|
| 2008/0085616 A1* | 4/2008 | Hirai | H05K 3/3426 439/83 |
| 2008/0182445 A1* | 7/2008 | Bertoncini | H01R 13/629 439/345 |

(Continued)

FOREIGN PATENT DOCUMENTS

| | | |
|---|---|---|
| JP | H07-85932 A | 3/1995 |
| JP | 2014-119691 A | 6/2014 |

*Primary Examiner* — Travis S Chambers
(74) *Attorney, Agent, or Firm* — Kenealy Vaidya LLP

(57) ABSTRACT

A board mounting type connector includes a housing, a plurality of contact portions to be extending from the housing toward a circuit board, and a plurality of protrusions to be protruding from the housing toward the circuit board. The plurality of contact portions are aligned along a width direction at a first position in a fitting direction. The connector and a mating connector are to be fit each other in the fitting direction. The width direction intersects the fitting direction. The plurality of protrusions are aligned along the width direction at a second position in the fitting direction. A distance between the first position and a position of a center of gravity of the connector in the fitting direction is longer than a distance between the second position and the position of the center of gravity in the fitting direction.

3 Claims, 6 Drawing Sheets

(51) Int. Cl.
*H01R 13/50* (2006.01)
*H01R 12/57* (2011.01)
*H01R 13/46* (2006.01)
*H01R 12/55* (2011.01)
*H01R 13/6594* (2011.01)

(52) U.S. Cl.
CPC ......... *G02B 6/4277* (2013.01); *G02B 6/4284* (2013.01); *H01R 12/57* (2013.01); *H01R 13/46* (2013.01); *H01R 13/50* (2013.01); *H01R 12/55* (2013.01); *H01R 13/6594* (2013.01)

(56) References Cited

U.S. PATENT DOCUMENTS

| | | | |
|---|---|---|---|
| 2015/0277063 A1 | 10/2015 | Hikosaka | |
| 2019/0058272 A1* | 2/2019 | Best | H01R 12/724 |
| 2021/0336368 A1* | 10/2021 | Iga | H01R 12/724 |

* cited by examiner

BOARD MOUNTING CONNECTOR WITH INCLINATION SUPPRESSING STRUCTURE

CROSS REFERENCE TO RELATED APPLICATIONS

This application is based on and claims priority from Japanese Patent Application No. 2020-007493 filed on Jan. 21, 2020, the content of which are incorporated herein by reference.

TECHNICAL FIELD

The present disclosure relates to a board mounting type connector.

BACKGROUND ART

In recent years, a board mounting type connector having a plurality of contact portions (for example, lead frames of an electronic device) soldered to a circuit pattern on a circuit board has been proposed. For example, JP2014-119691A discloses one of the board mounting type connectors of the related art that connects an optical fiber and an electronic device on a circuit board.

The connectors of JP2014-119691A includes a photoelectric conversion module (for example, Fiber Optical Transceiver (FOT)) having a photoelectric conversion element, a housing which is made of resin and accommodates the photoelectric conversion module therein, and a plurality of protrusions protruding toward the circuit board to adjust a posture of the housing with respect to the board.

In the connector described above, a plurality of terminals (that is, lead frames) provided in the photoelectric conversion module extend from the housing toward the circuit board. These terminals serve as contact portions with a circuit pattern on the circuit board. When mounting this connector on the circuit board, if the connector is placed on the circuit board so that a plurality of terminals and the circuit pattern on the circuit board corresponding to those terminals are in contact with each other, the plurality of protrusions of the housing also come in contact with the circuit board. As a result, the posture of the connector with respect to the circuit board is adjusted by the plurality of terminals and the plurality of protrusions and the plurality of terminals come into contact with the circuit pattern without irregularity. Then, each terminal and the circuit pattern are soldered and the mounting of the connector is completed.

However, when an unintended external force is applied to the terminals during the manufacturing and mounting process of the connector, some terminals may bend (so-called bend-down occurs) toward the circuit board beyond the manufacturing tolerance. In other words, the coplanarity (flatness) of the plurality of terminals may be impaired. In this case, when mounting the connector on the circuit board, some of the bent-down terminals come into contact with the circuit pattern before the other terminals, and the connector is supported on the circuit board by the some of the terminals and the protrusions of the housing. In this case, depending on the position of the center of gravity of the connector, the connector may be inclined so as to rotate around some of the bent-down terminals. In this case, depending on the magnitude of the inclination of the connector, it may be difficult to properly solder all the terminals. Therefore, it is desirable to suppress the inclination of the connector at the time of such mounting as much as possible.

SUMMARY OF INVENTION

One or more exemplary embodiments provide a connector capable of suppressing inclination at the time of mounting on a circuit board.

In accordance with one or more exemplary embodiments, a board mounting type connector includes a housing, a plurality of contact portions to be extending from the housing toward a circuit board, and a plurality of protrusions to be protruding from the housing toward the circuit board. The plurality of contact portions are aligned along a width direction at a first position in a fitting direction. The connector and a mating connector are to be fit each other in the fitting direction. The width direction intersects the fitting direction. The plurality of protrusions are aligned along the width direction at a second position in the fitting direction. A distance between the first position and a position of a center of gravity of the connector in the fitting direction is longer than a distance between the second position and the position of the center of gravity in the fitting direction.

BRIEF DESCRIPTION OF DRAWINGS

FIG. 4A is a rear view illustrating a state before mounting the connector FIG. 4B is an enlarged view of a portion B of FIG. 4A. FIG. 4C is a rear view illustrating a state in which mounting of the connector is completed. FIG. 4D is an enlarged view of a portion C of FIG. 4C.

FIG. 5A is a side view illustrating a state immediately before mounting the connector. FIG. 5B is a side view illustrating a state in which mounting of the connector is completed.

DESCRIPTION OF EMBODIMENTS

Figure 1:
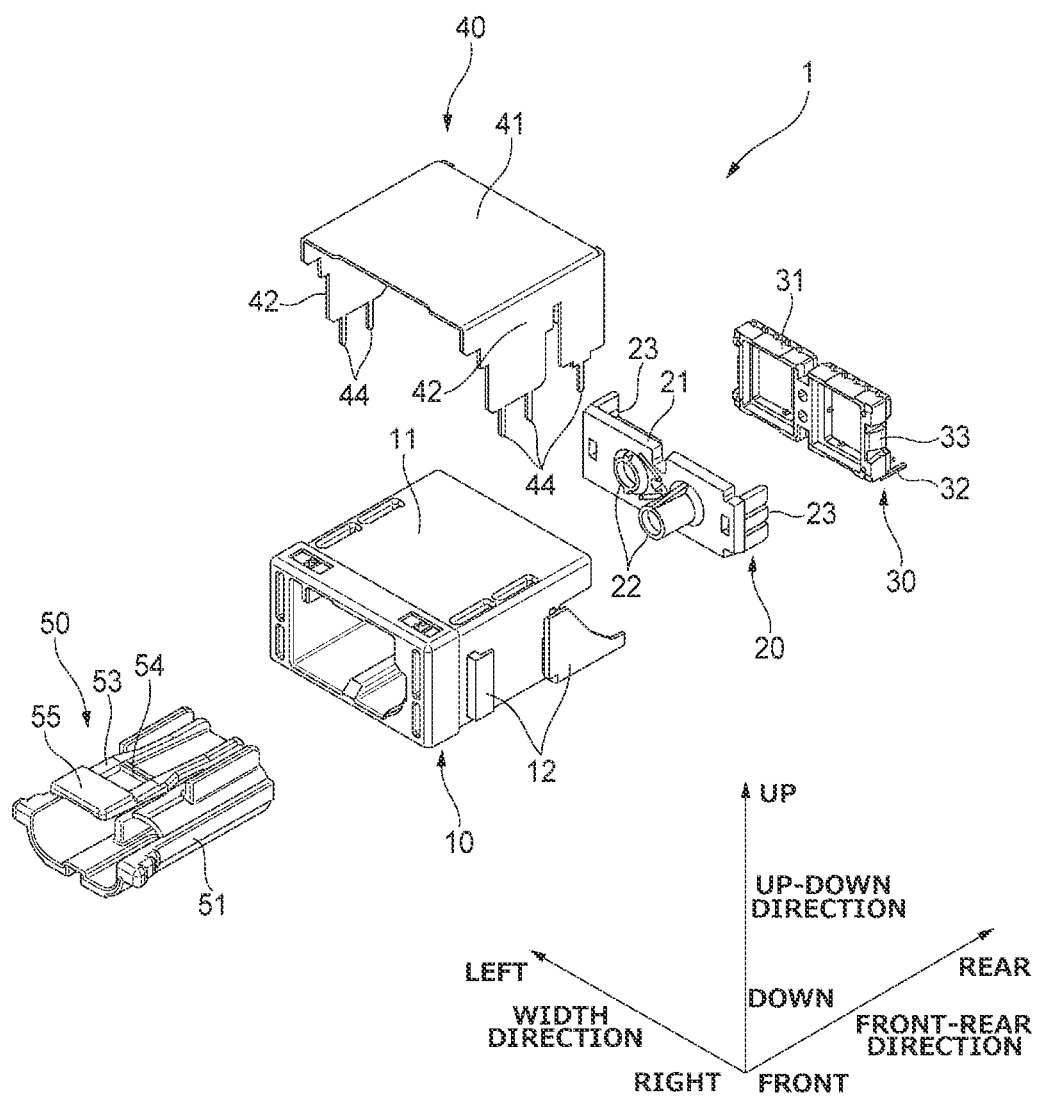
FIG. 1 is an exploded perspective view of a connector according to an embodiment.
Figure 3A:
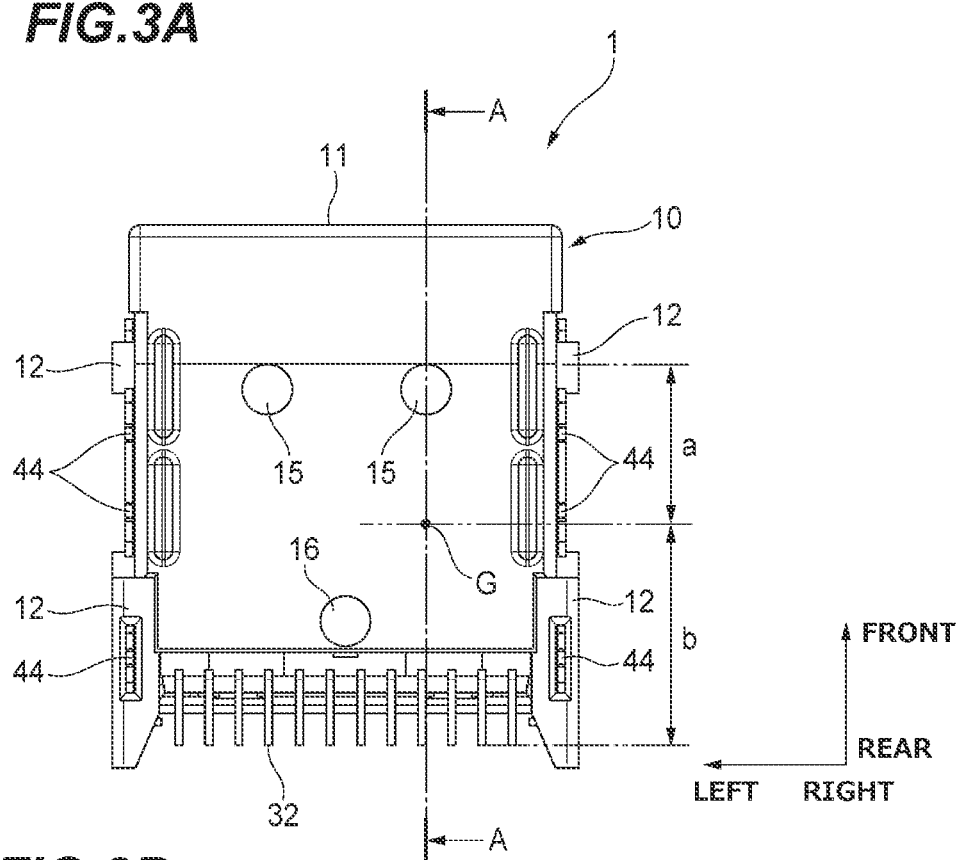
FIG. 3A is a bottom view of the connector according to the embodiment.
Figure 3B:
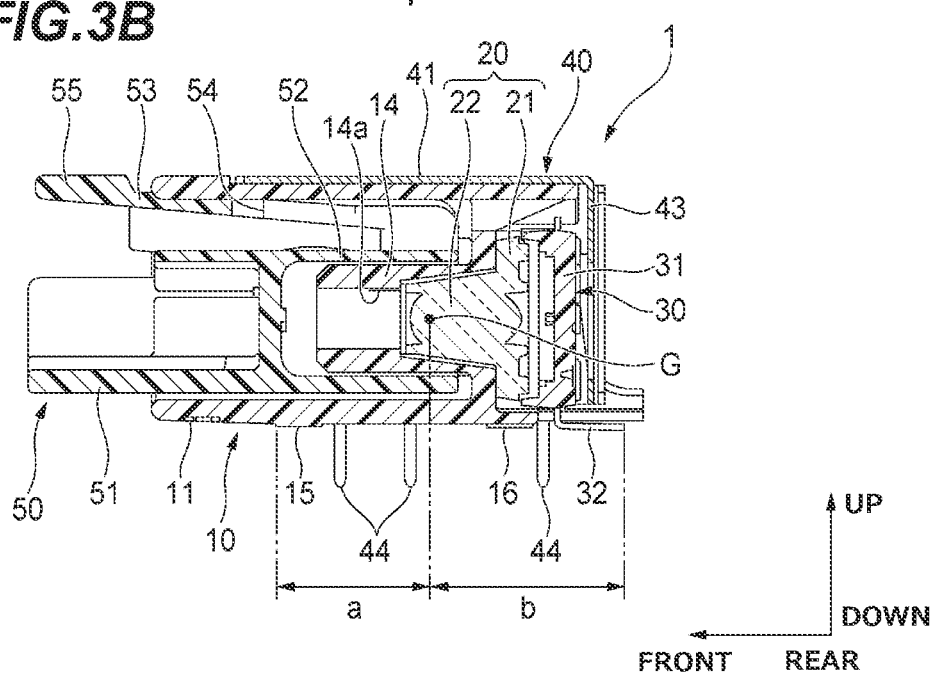
FIG. 3B is a cross-sectional view corresponding to a cross section taken along the line A-A of FIG. 3A in the connector according to the embodiment to which a dust cap is attached.

Hereinafter, a connector 1 according to an embodiment will be described with reference to the drawings. The connector 1 illustrated in FIGS. 1, 3A and 3B is a board mounting type connector used by being mounted on a circuit board 2 (see FIGS. 4A to 4D). The connector 1 has a function of communicably connecting an optical fiber (not illustrate) accommodated in a mating optical connector and an electronic device (not illustrated) on a circuit board 2 in a state where the mating optical connector (not illustrated) is fitted to a housing 10 belonging to the connector 1. In order to prevent dust from entering the inside of the housing 10 when the connector 1 is mounted on the circuit board 2, the housing 10 of the connector 1 is configured so that a dust cap 50 (see FIGS. 1, 3A, and 3B) can be attached instead of the mating optical connector.

Hereinafter, for convenience of explanation, as illustrated in FIGS. 1 to 6B, the "front-rear direction", "up-down direction", "width direction", "front", "rear", "up", "down", "left", and "right" will be defined. The front-rear direction", "up-down direction", and "width direction" are orthogonal to each other. The front-rear direction coincides with a fitting direction of the connector 1 and the mating optical connector (not illustrated).

As illustrated in FIG. 1, the connector 1 includes a housing 10, a lens body 20 accommodated inside the housing 10, a photoelectric conversion module 30 (for example, Fiber Optical Transceiver (FOT)) accommodated in the housing 10 so as to close a rear end opening of the housing 10, and a metal shield member 40 for noise reduction attached to the housing 10 so as to cover the housing 10. Hereinafter, each member forming the connector 1 will be described in order.

Figure 2:
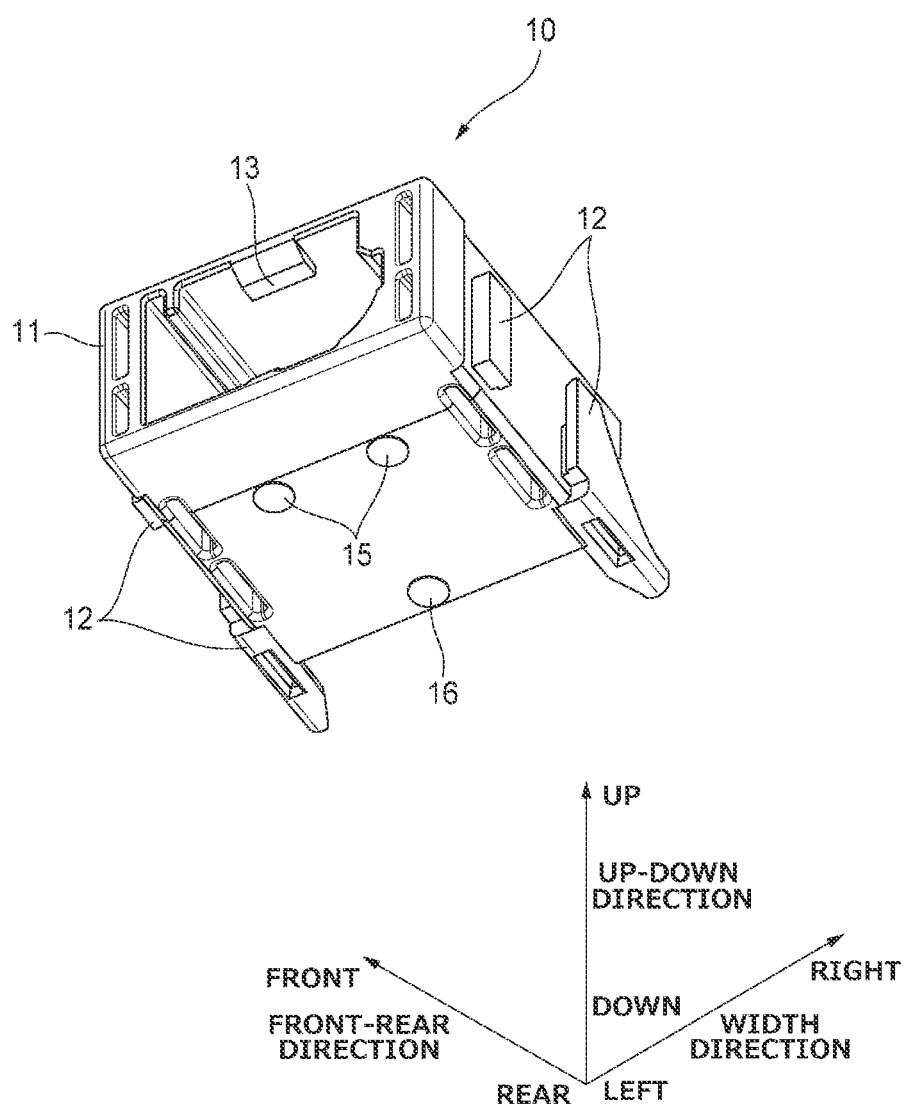
FIG. 2 is a perspective view of a housing illustrated in FIG. 1.

First, the housing 10 will be described. The housing 10 is a resin molded body and includes a housing body 11 having a substantially rectangular tubular shape extending in the front-rear direction as illustrated in FIGS. 1 and 2. The mating optical connector and the dust cap 50 are inserted into the housing body 11 through a front end opening of the housing body 11, and the lens body 20 and the photoelectric conversion module 30 are inserted into the housing body 11 through a rear end opening of the housing body 11.

As illustrated in FIGS. 1 to 3B, on an outer surface (outer surface in the width direction) of the pair of side walls of the housing body 11, a locking portion 12 for locking a pair of side plates 42 (see FIG. 1 and the like) of the shield member 40, which will be described below, to the housing body 11 is provided. As illustrated in FIG. 2, a lock protrusion 13 protruding downward is provided at a center of an inner surface (lower surface) of a front end portion of an upper wall of the housing body 11 in the width direction. When the dust cap 50 is attached to the housing 10, the lock protrusion 13 engages with a locking hole 54 (see FIG. 1) of the dust cap 50, which will be described below, to prevent the dust cap 50 from falling forward.

As illustrated in FIG. 3B, inside the housing body 11, a lens body holding portion 14 for holding the lens body 20 is formed so as to divide an internal space of the housing body 11 into two in the front-rear direction. The lens body holding portion 14 is formed with a pair of through holes 14a penetrating in the front-rear direction so as to be arranged in the width direction, corresponding to a pair of lens portions 22 described below in the lens body 20. The pair of lens portions 22 of the lens body 20 will be inserted into the pair of through holes 14a.

As illustrated in FIGS. 2 to 3B, on an outer surface (i.e. plane extending in the front-rear direction and the width direction) of a lower wall of the housing body 11, a pair of front protrusions 15 are formed so as to be aligned in the width direction at positions separated from the center in the width direction by the same distance to the left and right on a side located further on a front side than the center in the front-rear direction, and one rear protrusion 16 is formed at the center position in the width direction near a rear end. Therefore, when viewed from below, the pair of front protrusions 15 and one rear protrusion 16 are arranged at positions corresponding to the three vertices of the isosceles triangle.

The pair of front protrusions 15 and one rear protrusion 16 are columnar protrusions in this example, and the heights of protrusions from a lower wall (plane) of the housing body 11 are substantially the same. The pair of front protrusions 15 and one rear protrusion 16 are used to identify a reference plane which passes through the three vertices of the pair of front protrusions 15 and one rear protrusion 16. This reference plane is used to measure the amount of protrusion of the tip (extending end) of each of the plurality of lead frames 32 (see FIGS. 3A to 4D), which will be described below, downward from the reference plane in an assembled state of the connector 1.

Next, the lens body 20 will be described. The lens body 20 is made of a transparent resin having a light guide property and includes a body portion 21 having a rectangular flat plate shape extending in the width direction as illustrated in FIG. 1. A pair of lens portions 22 protruding forward are formed on a front surface of the body portion 21 so as to be arranged in the width direction. In this example, the heights of the pair of lens portions 22 protruding forward are different from each other. Of the pair of lens portions 22, one is a lens portion on a light emitting side and the other is a lens portion on a light receiving side.

A pair of locking pieces 23 extending rearward are formed on both edges of the body portion 21 in the width direction. The pair of locking pieces 23 fulfill a function of forming a subassembly in which the lens body 20 and the photoelectric conversion module 30 are integrated by engaging with a pair of locking claws 33 (see FIG. 1) described below of the photoelectric conversion module 30.

Next, the photoelectric conversion module 30 will be described. As illustrated in FIG. 1, the photoelectric conversion module 30 includes a body portion 31 which has a rectangular flat plate shape extending in the width direction and is made of resin. On a front surface of the main body 31, a pair of photoelectric conversion elements (not illustrated) mounted on a circuit board are integrated so as to be arranged in the width direction corresponding to the pair of lens portions 22.

One of the pair of photoelectric conversion elements is a photoelectric conversion element on the light emitting side and is, for example, a light emitting element such as a Light Emitting Diode (LED) or a Vertical Cavity Surface Emitting Laser (VCSEL). The other of the pair of photoelectric conversion elements is a photoelectric conversion element on the light receiving side and is, for example, a light receiving element such as a Photo Diode (PD).

A plurality of metal lead frames 32 are integrated into the body portion 31 by insert molding. The plurality of lead frames 32 are electrically connected to the pair of photoelectric conversion elements and extend downward and rearward from a lower end surface of the body portion 31 so as to be aligned in the width direction (see FIGS. 3A and 3B). Extending end portions (rear end portions) extending rearward of the plurality of lead frames 32 are respectively soldered to a plurality of pads 2a (see FIGS. 4B and 4D) provided so as to be arranged in the width direction on the upper surface of the circuit board 2. Further, the pair of locking claws 33 are formed on both side surfaces in the width direction of the body portion 31 corresponding to the pair of locking pieces 23 of the lens body 20.

Next, the shield member 40 will be described. The shield member 40 is formed by subjecting a single metal plate to a predetermined pressing process, bending process, or the like. As illustrated in FIG. 1, the shield member 40 includes a top plate 41 having a rectangular flat plate shape, a pair of side plates 42 hanging from both edges in the width direction of the top plate 41, and a back plate 43 (see FIG. 3B and FIGS. 4A to 4D) which has a rectangular flat plate shape and hangs from a rear end edge of the top plate 41.

As illustrated in FIG. 1, three rod-shaped ground portions 44 extend downward from a lower end edge of each side plate 42 so as to be aligned at a predetermined distance in the front-rear direction. The members forming the connector 1 are described above.

Next, a procedure for assembling the connector 1 will be described. First, the lens body 20 is brought closer to the photoelectric conversion module 30 from the front side and the pair of locking pieces 23 of the lens body 20 are locked to the pair of locking claws 33 of the photoelectric conversion module 30, in such a manner that a subassembly in which the lens body 20 and the photoelectric conversion module 30 are integrated is obtained.

Next, this subassembly is assembled into the housing 10. Specifically, the subassembly is inserted into the housing body 11 through the rear end opening of the housing body 11 of the housing 10 and the subassembly is held (fixed) to the housing 10 by using a fixing mechanism (not illustrated) between the housing 10 and the photoelectric conversion module 30 while inserting the pair of lens portions 22 into the pair of through holes 14a of the lens body holding portion 14. This completes the assembly of the subassembly to the housing 10.

When the assembly of the subassembly to the housing 10 is completed, the lens body 20 is accommodated inside the housing body 11 and the photoelectric conversion module 30 is accommodated in the housing 10 so as to close the rear end opening of the housing body 11. Lower surfaces of the extending end portions extending rearward of the plurality of lead frames 32 of the photoelectric conversion module 30 are located behind the rear end surface of the lower wall of the housing body 11 and slightly below the reference plane (plane passing through the three vertices of the pair of front protrusions 15 and one rear protrusion 16) (see FIG. 3B).

Next, the shield member 40 is assembled to the housing 10. Therefore, the shield member 40 is assembled to the housing body 11 from above so as to cover the surface of the housing body 11 from both sides in the width direction and the rear side, and the pair of side plates 42 of the shield member 40 are locked to the pair of side walls of the housing body 11 by using the locking portion 12 of the housing 10.

When the assembly of the shield member 40 to the housing 10 is completed, the assembly of the connector 1 is completed. As a result, the connector 1 illustrated in FIG. 3A is obtained. In the connector 1 in which the assembly is completed, as illustrated in FIG. 3B, a plurality of ground portions 44 of the shield member 40 protrude downward from the lower surface of the housing body 11.

As illustrated in FIGS. 3A and 3B, a center of gravity G of the connector 1 in a completed assembly state (that is, a state where the housing 10 is assembled with the lens body 20 and the photoelectric conversion module 30 and the dust cap 50 is not attached) is located at the center of the connector 1 (housing body 11) in the width direction and between the pair of front protrusions 15 and the extension end portions of the plurality of lead frames 32 in the front-rear direction. A distance b between extending ends (first position) of the plurality of lead frames 32 and the center of gravity G in the front-rear direction is longer than a distance a between front ends (second position) of the pair of front protrusions 15 and the center of gravity G in the front-rear direction. In other words, the center of gravity G of the connector 1 is located closer to the front end of the pair of front protrusions 15 than the extension ends of the plurality of lead frames 32 in the front-rear direction.

The pair of front protrusions 15 and the rear protrusion 16 are not limited to a columnar shape and may have, for example, a hemispherical shape or a polygonal pyramid shape (pyramid shape, or the like). When the pair of front protrusions 15 have a hemispherical or polygonal pyramid shape, the above-described distance a is defined as the length between protrusion ends (that is, the portions which can be contact points with the surface of the circuit board 2) of the pair of front protrusions 15 and the center of gravity G in the front-rear direction.

As illustrated in FIGS. 4A to 4D, the connector 1 which has been assembled is mounted on the upper surface of the circuit board 2. To prevent dust from entering the inside of the housing 10, it is preferable that this mounting operation is performed in a state (see FIG. 3B) where the dust cap 50 (see FIGS. 1, 3A, and 3B) is attached to the housing 10.

The dust cap 50 is a resin molded body, and as illustrated in FIGS. 1, 3A, and 3B, includes a body portion 51 which extends in the front-rear direction and has a shape which can be attached to the housing body 11 from the front. On the front end surface of the body portion 51, an accommodation portion 52 for accommodating a part of the lens body holding portion 14 located around the pair of through holes 14a is recessed so as to close the pair of through holes 14a of the lens body holding portion 14 when it is attached to the housing 10 (see FIG. 3B).

A lock arm portion 53 having a cantilever-like shape extending rearward and elastically deformable downward is formed on the upper wall of the body portion 51. A locking hole 54 is formed in the lock arm portion 53. When the dust cap 50 is attached to the housing 10, the locking hole 54 engages with the lock protrusion 13 (see FIG. 2) of the housing body 11 through a temporary downward elastic deformation of the lock arm portion 53. As a result, as illustrated in FIG. 3B, the state in which the dust cap 50 is attached to the housing 10 is maintained. This prevents the dust cap 50 from falling forward.

In a state where the dust cap 50 is attached to the housing 10 (see FIG. 3B), the center of gravity of the connector 1 is located behind the pair of front protrusions 15, but moved forward from the center of gravity G (that is, the center of gravity of the connector 1 in a state where the dust cap 50 is not attached) illustrated in FIGS. 3A and 3B.

In a state where the dust cap 50 is attached to the housing 10 (see FIG. 3B), an operating portion 55 located at the tip of the lock arm portion 53 protrudes forward from the front end of the housing body 11. Therefore, in a state where the dust cap 50 is attached to the housing 10, by pushing the operating portion 55 downward, the engagement between the lock protrusion 13 and the locking bole 54 is released, and thus the dust cap 50 can be removed from the housing 10 toward the front.

Figure 4A:
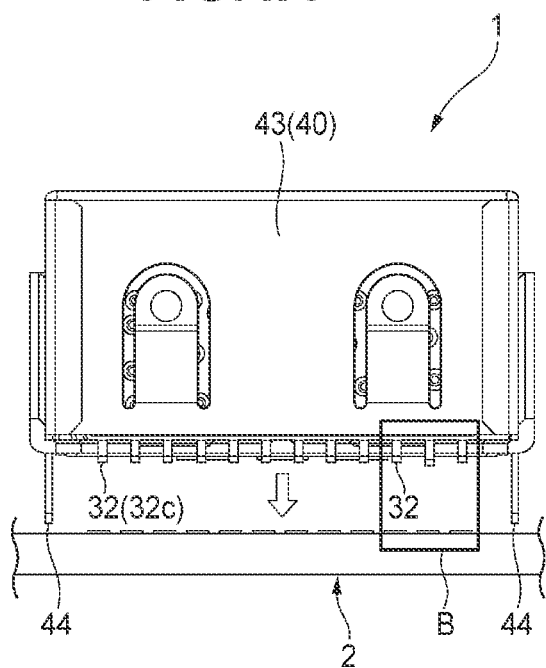
FIGS. 4A to 4D are figures for explaining a process when the connector according to the embodiment is mounted on a circuit board when bend-down occurs in one of a plurality of lead frames.
Figure 4B:
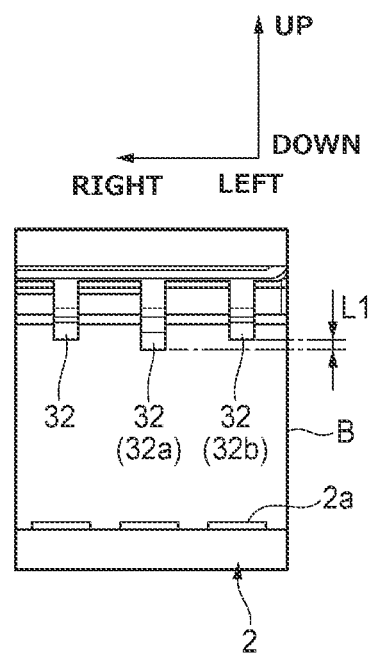
Figure 4C:
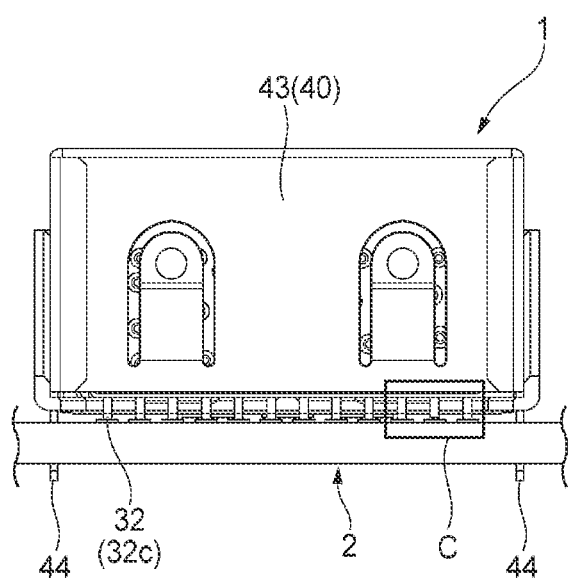
Figure 4D:
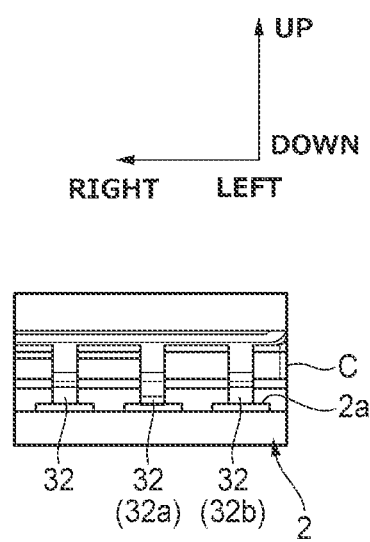

Next, a procedure for mounting the assembled connector 1 on the upper surface of the circuit board 2 will be described. In order to mount the assembled connector 1 on the upper surface of the circuit board 2, first, as illustrated in FIG. 4A, the connector 1 is arranged above the circuit board 2, a positioning mechanism (not illustrated) formed on the lower wall of the housing body 11 is engaged with a positioning portion (not illustrated) provided on the circuit board 2, and then the connector 1 is lowered with respect to the circuit board 2 in a state where the housing 10 is positioned with respect to the circuit board 2, as illustrated in FIG. 4B.

Along with this descent, first, a plurality (six in total) of ground portions 44 provided on the shield member 40 are respectively inserted into a plurality (six in total) of through holes (not illustrated) formed on the circuit board 2, and then the housing 10 is placed on the circuit board 2.

Hereinafter, first, a case where bend-down does not occur in any of the plurality of lead frames 32 will be described. In this case, in a state where the pair of front protrusions 15 and all the extending ends of the plurality of lead frames 32 are in contact with the upper surface of the circuit board 2, the housing 10 is placed on the circuit board 2 in an appropriate posture (a posture in which the outer surface of the lower wall of the housing 10 and the upper surface of the circuit board 2 are substantially parallel to each other). As a result, all the extending ends of the plurality of lead frames 32 are in contact with the plurality of pads 2*a* formed on the upper surface of the circuit board 2 without irregularity.

Next, using a reflow method or the like, the extending ends of the plurality of lead frames 32 are respectively soldered to the plurality of pads 2*a* of the circuit board 2, and the plurality of ground portions 44 of the shield member 40 are respectively soldered to the plurality of through holes of the circuit board 2. From the above, the mounting of the connector 1 on the circuit board 2 is completed (see FIG. 3A).

Next, as illustrated in FIG. 4A, a case where bend-down occurs in any of the plurality of lead frames 32 will be described. In the example illustrated in FIG. 4A, bend-down occurs only in the lead frame 32 (hereinafter referred to as "lead frame 32*a*"), which is the second from the left among the plurality of lead frames 32, and the extending end of the lead frame 32*a* protrudes downward by a distance L1 as compared with all the extending ends of the lead frames 32 (see FIG. 4B). Hereinafter, as illustrated in FIG. 4A to 4D, for convenience of explanation, among the plurality of lead frames 32, the lead frame 32 located at the left end is referred to as "lead frame 32*b*" and the lead frame 32 located at the right end is referred to as "lead frame 32*c*".

In this way, when bend-down occurs only in the lead frame 32*a*, if the descending housing 10 is placed on the circuit board 2, only the lead frame 32*a* of the plurality of lead frames 32 comes into contact with the corresponding pad 2*a* first. Therefore, the housing 10 is in a state of being supported by the pair of front protrusions 15 and the lead frame 32*a*.

In this state, in a virtual mode (mode different from the connector 1) in which the center of gravity G of the connector 1 is located closer to the extending ends of the plurality of lead frames 32 than the front ends of the pair of front protrusions 15 in the front-rear direction, the connector 1 tends to be inclined unintentionally so that the right rear part of the connector 1 moves downward and the left front part of the connector 1 moves upward with the lead frame 32*a* and the front protrusion 15 on the right side as fulcrums.

When the connector is inclined in this way, the lead frame 32*a*, the lead frame 32*c*, and the front protrusion 15 on the right side come into contact with the circuit board 2 and the front protrusion 15 on the left side and a plurality of lead frames 32 excluding the lead frames 32*a* and 32*c* are in a state of being floated from the circuit board 2. In this state, among the plurality of lead frames 32 excluding the lead frames 32*a* and 32*c*, the amount of floating from the circuit board 2 (pad 2*a*) of the lead frame 32*b* located further on the left side than the lead frame 32*a* tends to be excessively large. As a result, it is highly likely that proper soldering will be difficult, especially for the lead frame 32*b*.

On the other hand, in the connector 1, as described above, the center of gravity G of the connector 1 (regardless of whether or not the dust cap 50 is attached) is located closer to the pair of front protrusions 15 than the extension ends of the plurality of lead frames 32 in the front-rear direction. Therefore, even when the bend-down occurs only in the lead frame 32*a*, when the descending housing 10 is placed on the circuit board 2, the unintended inclination of the connector 1 as described above is unlikely to occur. As a result, the housing 10 is easily maintained in a state of being supported by the pair of front protrusions 15 and the lead frame 32*a*.

Thus, it is difficult for the amount of floating from the circuit board 2 (pad 2*a*) to become excessively large for all the plurality of lead frames 32 except the lead frame 32*a*, so that proper soldering is unlikely to be difficult. The procedure for mounting the connector 1 on the upper surface of the circuit board 2 has been described above.

When the mounting of the connector 1 on the circuit board 2 is completed, the plurality of lead frames 32 of the photoelectric conversion module 30 are electrically connected to the electronic device on the circuit board 2. As a result, when the mating optical connector is fitted to the connector 1 mounted on the circuit board 2, an electric signal generated by the electronic device of the circuit board 2 is converted into an optical signal by the photoelectric conversion element on the light emitting side of the photoelectric conversion module 30 and the converted optical signal is incident on the lens portion 22 on the light emitting side of the lens body 20, and then it is guided to one of the optical fibers accommodated in the mating optical connector. Also, the optical signal incident on the lens portion 22 on the light receiving side of the lens body 20 from the other optical fiber accommodated in the mating optical connector is received by the photoelectric conversion element on the light receiving side of the photoelectric conversion module 30 and converted into an electric signal, and then the converted electrical signal is transmitted to the electronic device on the circuit board 2.

As described above, according to the connector 1 of the embodiment, even when the housing 10 is supported by the lead frame 32*a* of the plurality of lead frames 32 and the pair of front protrusions 15 due to the bend-down in a part (lead frame 32*a*) of the plurality of lead frames 32, since the center of gravity G of the connector 1 is closer to the front protrusion 15 than the lead frame 32 (see the relationship of a<b in FIGS. 3A and 3B), the inclination of the connector 1 is less likely to occur, compared with the case where the center of gravity G of the connector 1 is closer to the lead frame 32 than the front protrusion 15. Therefore, the connector 1 according to the embodiment can suppress an unintended inclination at the time of mourning on the circuit board 2.

The invention is not limited to each of the above embodiments and various modification examples can be adopted within the scope of the invention. For example, the invention is not limited to the above-described embodiment and can be appropriately modified, improved, and the like. In addition, the material, shape, size, number, arrangement location, and the likes of each component in the above-described embodiment are arbitrary and are not limited as long as the invention can be achieved.

Figure 5A:
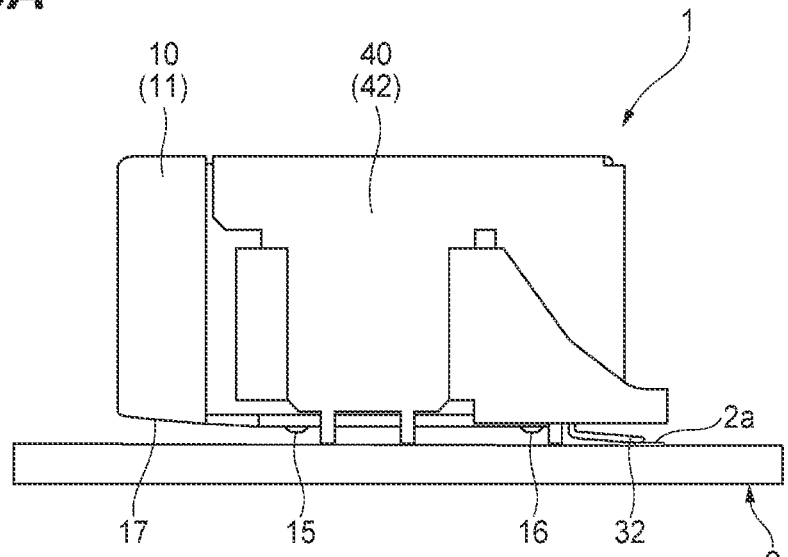
FIGS. 5A and 5B are figures for explaining a process when a connector according to a modification example is mounted on a circuit board in a state the connector is inclined with respect to the circuit hoard.
Figure 5B:
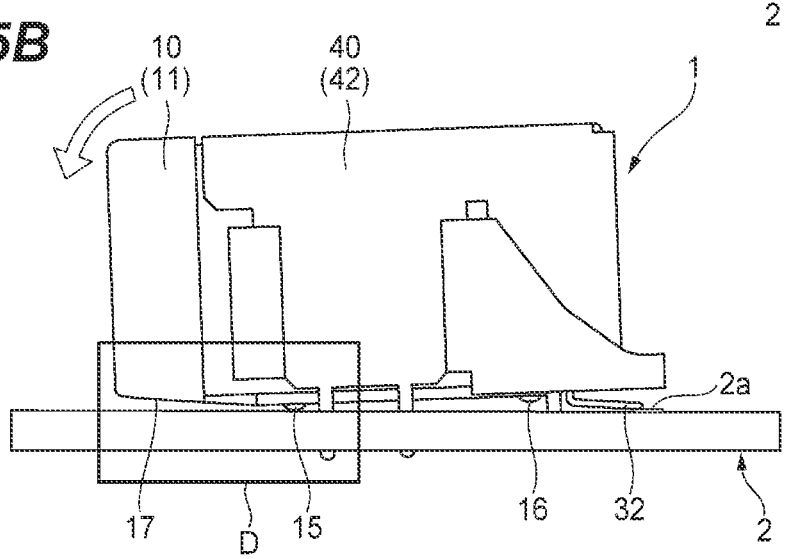
Figure 5C:
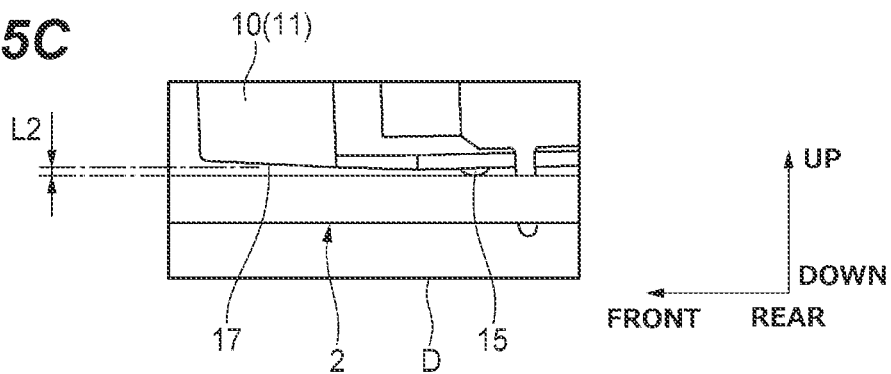
FIG. 5C is an enlarged view of a portion D of FIG. 5B.

For example, in the embodiment described above, the entire outer surface of the lower wall of the housing body 11 is a flat surface extending in the front-rear direction and the width direction. On the other hand, as illustrated in FIG. 5A, at the front end on the outer surface of the lower wall of the housing body 11, an inclined portion 17 which inclines in a direction away from the circuit board 2 as it moves forward may be provided. In this case, as illustrated in FIG. 5B, even when the connector 1 is inclined in the direction in which the front end of the housing 10 approaches the circuit board 2 around the pair of front protrusions 15 at the time of mounting, it is difficult for the front end (that is, the inclined portion 17) of the housing 10 and the circuit board 2 to come into contact with each other and a gap L2 (see FIG. 5C) is easily secured between the two. Therefore, it is possible to suppress an unintended inclination of the connector 1 due to the front end of the housing 10 coming into contact with the circuit board 2.

Figure 6A:
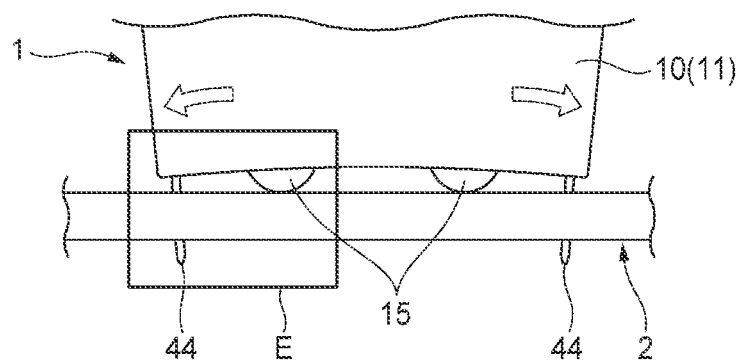
FIG. 6A is a schematic front view illustrating a state in which a connector according to another modification example is mounted on a circuit board.
Figure 6B:
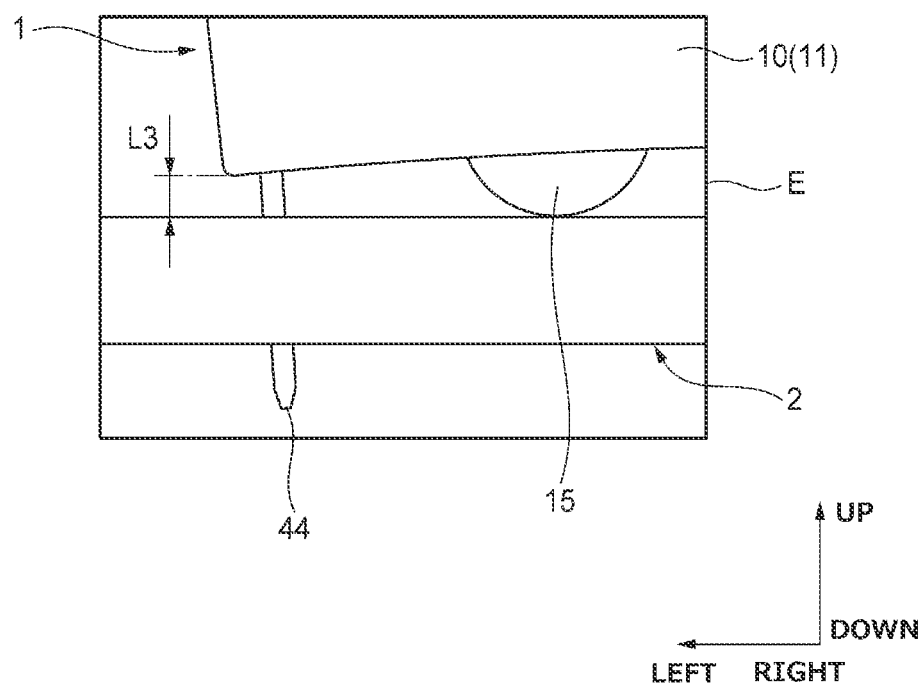
FIG. 6B is an enlarged view of a portion E of FIG. 6A.

Further, as illustrated in FIG. 6A, even when the outer surface of the lower wall of the housing body 11 is warped in a direction in which both edges in the width direction approach the circuit board 2 with respect to a center portion in the width direction due to the cooling time or the like at the time of molding of the housing 10, it is preferable that the pair of front protrusions 15 protrude downward to a position closer to the circuit board 2 than the both edges in the width direction of the outer surface of the lower wall of the housing body 11. According to this structure, when the pair of front protrusions 15 are in contact with the circuit board 2, a gap L3 (see FIG. 6B) is secured between the widthwise both edges of the outer surface of the lower wall of the housing body 11 and the circuit board 2. As a result, it is possible to suppress an unintended inclination of the connector 1 due to contact of both edges of the housing 10 in the width direction with the circuit board 2.

In accordance with embodiments and modifications, a board mounting type connector 1 includes a housing 10, a plurality of contact portions 32 extending from the housing 10 toward a circuit board 2, and a plurality of protrusions 15 protruding from the housing 10 toward the circuit board. The plurality of contact portions 32 are arranged so as to be aligned along a width direction intersecting a fitting direction at a first position in the fitting direction between the connector 1 and a mating connector. The plurality of protrusions 15 are arranged so as to be aligned along the width direction at a second position in the fitting direction. The connector 1 is configured such that a distance b between the first position and a position of the center of gravity G of the connector 1 in the fitting direction is longer than a distance a between the second position and the position of the center of gravity G in the fitting direction.

According to this structure, even when the housing is supported on the circuit board only by some contact portions and the plurality of protrusions because bend-down occurs in a part of the plurality of contact portions (for example, the lead frames of the electronic device built in the connector), since the center of gravity of the connector is located closer to the protrusion than the contact portion (that is, a distance between the first position corresponding to the contact portion and the position of the center of gravity of the connector in the fitting direction is longer than a distance between the second position corresponding to the protrusion and the position of the center of gravity in the fitting direction), the connector is less likely to be inclined, compared with the case where the center of gravity of the connector is located closer to the contact portion than the protrusion. That is, the connector of this configuration can properly maintain the posture of the connector on the circuit board regardless of whether or not the contact portion is subjected to bend-down. In this way, the connector of this structure can suppress the inclination when mounted on the circuit board.

In the board mounting type connector 1, the housing 10 may be configured such that a bottom surface portion which faces the circuit board 2 is inclined so as to be separated from the circuit board 2 as a distance from the first position increases at an end portion opposite to the first position with the second position interposed therebetween in the fitting direction.

According to this structure, the bottom surface portion of the end portion of the housing is inclined so as to be separated from the circuit board. Therefore, when the connector is supported on the circuit board by the plurality of terminal portions and protrusions during mounting, even when the connector is inclined like a seesaw around the protrusion (that is, the second position) and the end portion of the housing approaches the circuit board, it is difficult for the end portion to come into contact with the circuit board. If the end portion of the connector comes into contact with the circuit board, there is a possibility that the connector's posture cannot be maintained properly due to problems such as the protrusion separating (floating) from the circuit board. Therefore, the connector of this configuration can suppress the inclination of the connector due to the contact of the end portion of the connector with the circuit board.

In the board mounting type connector 1, the protrusion 15 protrudes to a position closer to the circuit board 2 than both edges of the housing 10 in the width direction.

According to this structure, the protrusion of the housing protrudes to a position closer to the circuit board than both edges of the housing. Therefore, it is difficult for both edges to come into contact with the circuit board during mounting. If one or both of the edges of the connector come into contact with the circuit board, the connector may not be able to maintain its proper posture due to problems such as the protrusions separating (floating) from the circuit board. Therefore, the connector of this configuration can suppress the inclination of the connector due to the contact of both edges of the connector with the circuit board.

What is claimed is:

1. A board mounting type connector comprising:
    a housing to be mounted to a circuit board, the housing having a bottom surface portion to face the circuit board;
    a plurality of contact portions to be extending from the housing toward the circuit board; and
    a plurality of protrusions disposed on the bottom surface portion of the housing, and to be protruding from the housing toward the circuit board,
    wherein the plurality of contact portions are aligned along a width direction at a first position in a fitting direction, the fitting direction being a direction that the connector and a mating connector are to be fit each other, the width direction intersecting the fitting direction,
    wherein the plurality of protrusions are aligned along the width direction at a second position in the fitting direction, and
    wherein a distance between the first position and a position of a center of gravity of the connector in the fitting direction is longer than a distance between the second position and the position of the center of gravity in the fitting direction.

2. The board mounting type connector according to claim 1,
    wherein the plurality of contact portions are disposed in a first side of the center of gravity in the fitting direction,
    wherein the plurality of protrusions are disposed in a second side of the center of gravity in the fitting direction, and
    wherein the bottom surface is inclined in the fitting direction so as to be separated from the circuit board as the bottom surface extends from the second position toward an end portion of the housing in the second side.

3. The board mounting type connector according to claim 1, wherein the plurality of protrusions protrude to positions closer to the circuit board than both edges of the housing in the width direction.

* * * * *